United States Patent [19]

Hilliard

[11] 4,282,994
[45] Aug. 11, 1981

[54] WHEEL CARRIER ASSEMBLY

[76] Inventor: Raymond C. Hilliard, 2126 8th Ave. North, Great Falls, Mont. 59401

[21] Appl. No.: 48,458

[22] Filed: Jun. 14, 1979

[51] Int. Cl.³ ............................................. B62D 43/02
[52] U.S. Cl. ............................. 224/42.06; 224/42.15; 224/42.21
[58] Field of Search ............ 224/42.15; 224/42.03 R, 224/42.03 A, 42.06, 42.08, 42.21, 42.24, 42.15, 42.16, 42.18, 42.19

[56] References Cited

U.S. PATENT DOCUMENTS

| 964,153 | 7/1910 | Gaynor | 224/42.21 |
|---|---|---|---|
| 1,926,350 | 9/1933 | Olson | 224/42.21 |
| 2,698,118 | 12/1954 | Dickason | 224/42.21 |
| 3,283,973 | 11/1966 | Wargo | 224/42.21 |
| 3,326,434 | 6/1967 | Cheadle | 224/42.21 |
| 3,894,668 | 7/1975 | Chapman et al. | 224/42.21 X |
| 4,089,554 | 5/1978 | Myers | 224/42.03 A |

FOREIGN PATENT DOCUMENTS 1055703  2/1954  France ................................. 224/42.21

Primary Examiner—Stephen Marcus
Attorney, Agent, or Firm—Arthur L. Urban

[57] ABSTRACT

A spare wheel carrier assembly including a vehicle mounting portion, a supporting portion, and a wheel holding portion; said vehicle mounting portion including a socket member engageable with a vehicle bumper, a post section extending upwardly from the socket member, a bracket section affixed adjacent the upper portion of the post section, the bracket section including means for attaching same to a vehicle body; the supporting portion including a plurality of hinge members, arm sections extending from the hinge members and being joined by a connecting section adjacent the ends thereof remote from the hinge members; the wheel holding portion including a hub member, mechanism for securing a wheel to the wheel holding portion, the wheel holding portion being affixed to the supporting portion intermediate the hinge members and the connecting section.

9 Claims, 5 Drawing Figures

U.S. Patent     Aug. 11, 1981     4,282,994
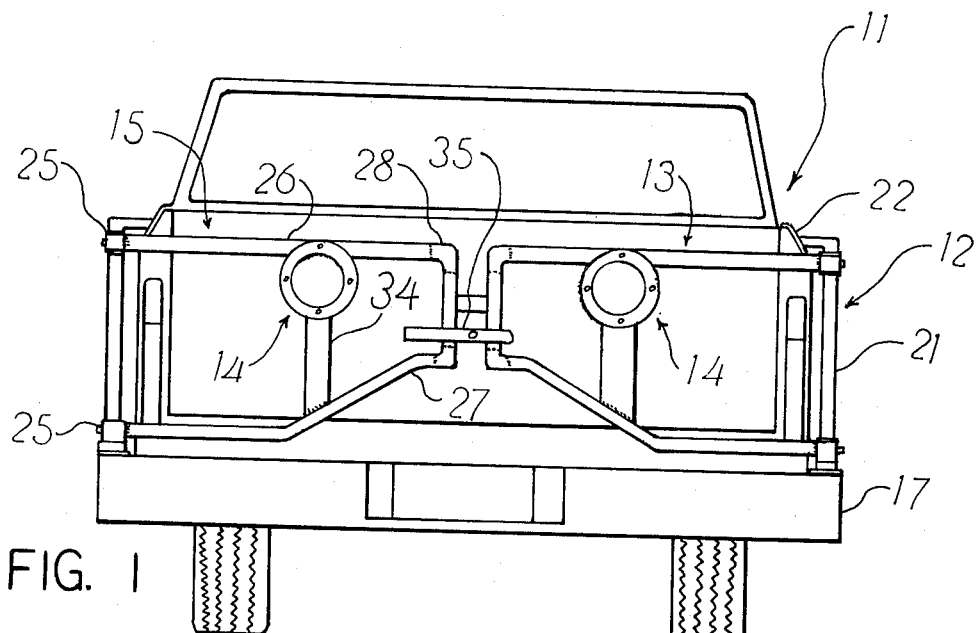
FIG. 1
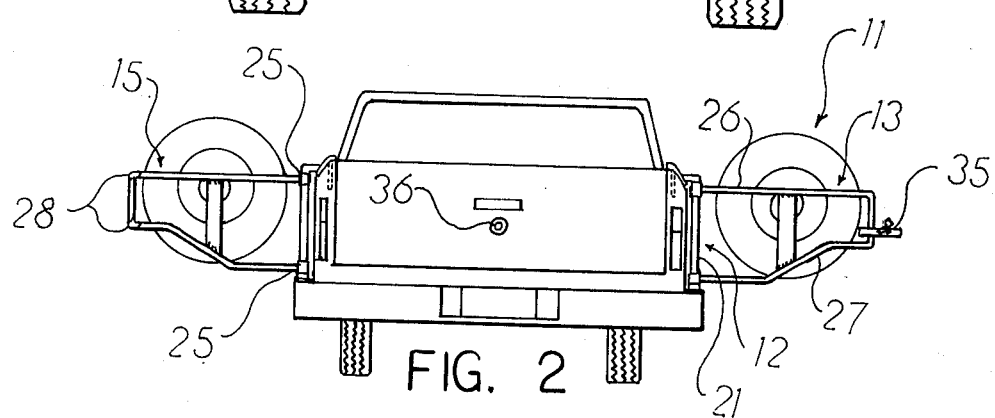
FIG. 2
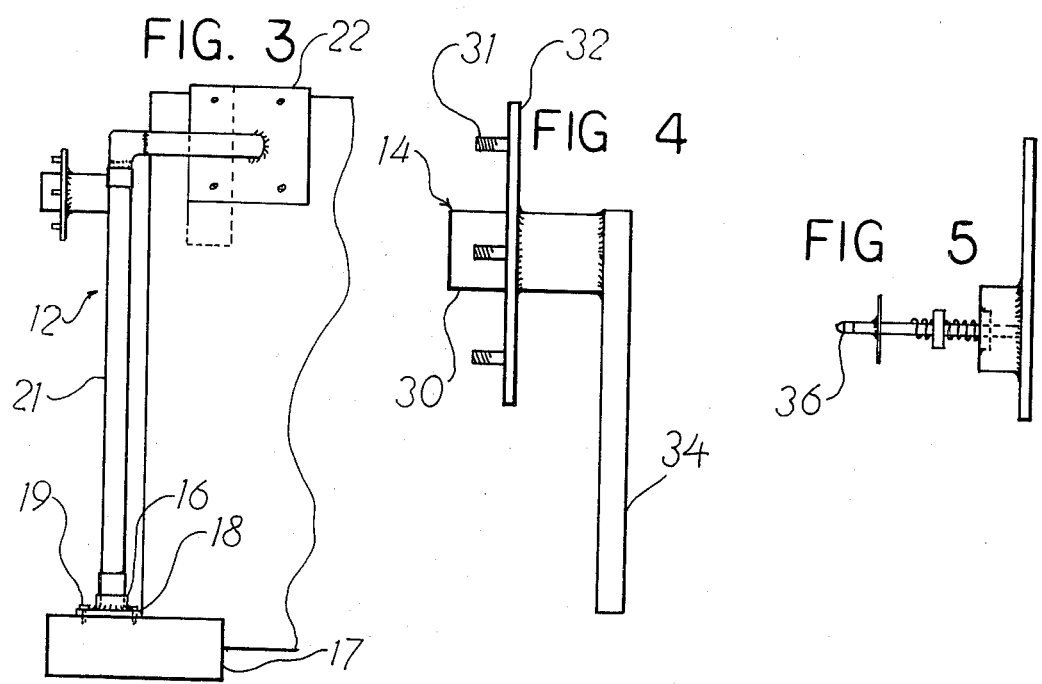

WHEEL CARRIER ASSEMBLY

This invention relates to a novel wheel carrier assembly and more particularly relates to an assembly for carrying a spare wheel on a vehicle. One of the important accessories on vehicles is the spare wheel and tire. The owner of a vehicle has no way of knowing when he may have a flat tire or in some other way, damage a tire in his travels. Therefore, a conscientious driver will always be sure that he has a serviceable spare tire with him.

While this may be a desirable objective, achieving this result may present a problem. Conventional passenger vehicles such as sedans ordinarily store a spare tire in the trunk of the vehicle. Station wagons generally store their spare tires in one wheel well or under the cargo floor. However, with recreational vehicles, storage for spare tires often presents difficulties since such vehicles utilize their space for other purposes and thus may not have space available for tire storage when loaded.

With some vehicles, such as pickup trucks the spare tire may be stored under the cargo bed and held in position with a supporting bracket. However, this location is very inconvenient to reach if it is necessary to change a tire. As a result, many truck owners merely throw the spare tire into the back of the truck. This may provide ready access to the spare tire if the truck is empty, but is maybe inconvenient when the truck box is to be used for hauling cargo.

In such cases the spare tire must be removed and then thrown on top of the load or wedged into a corner. If this is not possible, the driver may elect to travel without a spare tire and risk being stranded or, at the least, an extended delay and the inconvenience of a trip back to his original location to get the spare if he needs to change the tire.

Various attempts have been made to overcome spare tire storage problems. Some truck owners have added mounting brackets on the sides of the cargo box. While this arrangement keeps the tire out of the way of the cargo area, it still may present a problem because of the overhang of the tire beyond the normal vehicle dimensions.

The problem of spare tire storage becomes more significant with recreational vehicles with enclosed bodies. Ordinarily, the inside of vehicles such as vans, compers, mobile homes and the like is finished and/or furnished with carpeting, furniture, etc. and the driver does not wish to have a dirty, smelly spare tire in these surroundings.

Many closed body vehicles simply mount the spare tire on the rear of the vehicle. In cases where the vehicle does not have rear doors, this ordinarily presents a satisfactory solution. However, if the vehicle has rear doors or openings, rear mounting may present difficulties.

If the spare tire is mounted on a door, the weight of the tire may create an excessive load on the door and its hinges with the result that the door may sag and not close properly. Such an arrangement may necessitate special reinforcement for the door and the extra expense resulting therefrom. This reinforcement also adds weight to the door and thus makes it more difficult to operate particularly by young people or ladies.

It has also been proposed to use pivoting spare tire carriers. With such carriers, it is customary to attach hinged brackets to the vehicle body and utilize a swinging arm suspended therefrom. The tire carrier normally is positioned against the rear of the vehicle. When access to the rear door is desired, the tire and carrier are swung away from the doors.

While such pivoting carriers may be satisfactory with vehicles which have relatively small tires, problems may arise if the tire and wheel on which it is mounted are of large size and heavy weight. If the driver is not careful in his use of such pivoting carriers, he may rip one or more of the carrier hinges from the body of the vehicle and cause considerable damage thereto. Also, while such carriers ordinarily have some latching mechanism to hold the wheel and carrier against the rear of the body, if this latch should open while the vehicle is moving over the road, the tire and carrier may be ripped from the vehicle also resulting in damage. It is apparent from the above discussion that presently available spare tire carriers and mountings for vehicles and trucks are not satisfactory in many situations.

The present invention provides a novel spare wheel carrier assembly which enables a spare tire and wheel to be stored on a vehicle safely and conveniently. Furthermore, the wheel carrier assembly of the invention provides a convenient means for storing a spare tire on vehicles with rear openings and/or doors. In addition, the wheel carrier assembly eliminates the problems attendant with mounting a spare tire on a rear door of a vehicle. Also, the carrier of the invention minimizes the risk of damage to the vehicle body with heavy-weight large sized spare tires.

The spare wheel and tire carrier assembly of the present invention is simple in design and relatively inexpensive to manufacture. The tire carrier can be fabricated from commercially available components and materials utilizing conventional metal working techniques. Also, the tire carrier assembly of the invention can be installed easily with a minimum of instruction. Moreover, the carrier assembly is readily adaptable to different types of vehicles. Furthermore, the carrier is convenient to use even by young people and ladies.

Other benefits and advantages of the novel spare wheel carrier assembly of the present invention will be apparent from the following description and the accompanying drawings in which:

FIG. 1 is a side elevation of one form of the spare wheel carrier assembly of the invention mounted on the rear of a pick-up truck body;

FIG. 2 is a reduced side view of one wheel carrier assembly shown in FIG. 1 with the tailgate accessible;

FIG. 3 is an enlarged side view of the mounting portion of the wheel carrier assembly shown in FIG. 1;

FIG. 4 is an end view of the wheel holding portion of the wheel carrier assembly shown in FIG. 1; and FIG. 5 is a side view of the latch anchor portion of the wheel carrier assembly shown in FIG. 1.

As shown in the drawings, one form of the novel spare wheel and tire carrier assembly 11 of the present invention includes a vehicle mounting portion 12, a supporting portion 13 and a wheel holding portion 14. Advantageously, a second tire carrier assembly 15 is disposed symmetrically with respect to the first carrier assembly 11.

The mounting portion 12 includes a socket member 16 which as shown is fastened to a bumper 17 of a vehicle. The socket member 16 includes a flange portion 18 with openings through which are positioned bolts 19 which fasten the socket member to the bumper. A post section 21 extends upwardly from the socket member 16 which engages the lower end of the post section. The upper part of post section 21 includes a bracket section 22. The bracket section 22 includes means for attaching bracket section 22 to a vehicle body shown as pick-up body 23. The means for attaching the bracket section includes a flange portion with a plurality of openings therein for bolting the bracket to the pick-up body.

A wheel supporting portion 13 includes a plurality of hinged members 25. Advantageously, the hinged members 25 are sleeve sections as shown, which sleeves surround the post section 21 of the mounting portion 12. The support portion 13 also includes arm sections 26 and 27. The arm sections are arranged with an upper and lower arm, 26 and 27 respectively. Advantageously, at least one of the arm sections of the supporting portion is disposed generally horizontally. As shown particularly in FIG. 2, arm section 26 is disposed in a horizontal position. The arm sections 26 and 27 are joined by a connecting section 28. The arm sections are joined adjacent the ends thereof which are remote from the hinge members 25.

The wheel holding portion 14 as shown in FIG. 4 includes a hub portion 30 and means for securing a wheel thereto. As shown in FIG. 4, bolts 31 advantageously extend from a flange portion 32 of the hub. The bolts are equally spaced in a pattern to fit the bolt pattern of a wheel. Alternatively, the flange portion 32 may have a plurality of openings (not shown) arranged in a pattern similar to the bolt pattern. In the latter case, bolts may be inserted through openings in the wheel and threaded into the openings in flange 32.

The wheel holding portion 14 is affixed to the supporting portion 13 intermediate the hinged members 25 and the connecting section 28. Advantageously, the supporting portion 13 includes a cross member 34 intermediate the hinge members 25 and connecting section 28. Preferably, the wheel holding portion 14 is affixed to cross member 34.

The spare wheel carrier assembly also advantageously includes latch means disposed on the connecting section 28 joining the arm sections 26 and 27 of the supporting portion 13. Preferably, a pivoting latch 35 engages an anchor member 36 as shown in FIG. 5.

To install the novel spare tire carrier assembly of the present invention shown in the drawings on a vehicle, first, post section 21 is inserted through the hinge members 25 of the supporting portion 13. Next, the lower end of the post section is inserted into the socket member 16 which has been secured to bumber 17, e.g. by bolting the socket member thereto. The socket member 16 is positioned so that when post section 21 of the mounting portion 12 is inserted therein, the bracket section 22 on the upper part of the post section will be in position for attachment to the upper portion of the pick-up body 23. The bracket section 22 is attached to the pick-up body by bolting the flange portion of the bracket section to the body. Thus, the wheel carrier assembly of the invention is installed quickly and conveniently. A second carrier assembly 15 may be installed in the same way on the other rear corner of the vehicle.

The latch mechanism 35 is secured to the connecting section 28 of the carrier assembly and the anchor member 36 is affixed to the center of the tailgate of the vehicle body so that the latch 35 will engage the anchor and secure the carrier assembly or assemblies in a locked position.

When it is desired to open the tailgate of the vehicle, latch 35 is separated from anchor member 36. This action allows the carrier assemblies to be pivoted on the post sections 21 away from the tailgate so that the tailgate can be lowered in the same way that it normally would.

After the tailgare is returned to its closed position, the carrier assembly can be swung against the tailgate and latched to the anchor 36. The vehicle can then be driven with the confidence that the spare tire and wheel and the carrier assembly will be secure.

The above description and the accompanying drawings show that the present invention provides a novel spare whell carrier assembly which stores a spare tire and wheel on a vehicle safely and conveniently. The carrier assembly of the invention provides storage of a spare tire on vehicles with rear openings and/or doors. Furthermore, the wheel carrier assembly eliminates problems commonly encountered when a spare tire is mounted on a rear door of a vehicle. Also, the carrier assmbly is suitable for use with tires of substantial size and weight. In addition, the carrier assembly is convenient to use even by ladies and young people.

The spare tire carrier assembly of the present invention is simple in design and can be fabricated relatively inexpensively. The carrier assembly of the invention can be fabricated from commercially available components and materials. Moreover, the carrier assembly of the invention is readily adaptable to different types of vehicles and can installed thereon easily with a minimum of instruction.

It will be apparent that various modifications can be made in the particular spare wheel and tire carrier assembly described in detail above and shown in the drawings within the scope of the invention. For example, the size and configuration of the components can be changed to meet specific requirements. Also, the method of attaching the carrier assembly can be modified for particular vehicles. In addition, while the structural portions are shown as cylindrical tubing, other structural forms such as square tubing, bars and the like may be employed if desired. Therefore, the scope of the invention is to be limited only by the following claims:

What is claimed is:

1. A spare wheel apparatus including two symmetrical wheel carrier assemblies, each assembly including a vehicle mounting portion, a supporting portion and a wheel holding portion, said vehicle mounting portion including a socket member engageable with a vehicle bumper, a post section extending upwardly from said socket member, a bracket section affixed adjacent the upper portion of said post section, said bracket section including means for attaching same to a vehicle body, said supporting portion including a plurality of hinge members and being joined by a connecting section adjacent the ends thereof remote from said hinge members, said wheel holding portion including a hub member, means for securing a wheel to said wheel holding portion, said wheel holding portion being affixed to said supporting portion intermediate said hinge members and said connecting section; said apparatus including latch means selectively connecting said two wheel carrier assemblies, an anchor member mountable on a vehicle body at a point thereon between said assemblies; whereby said latch means is selectively engageable with said anchor member to lock said two wheel carrier assemblies in a single vertical plane.

2. A spare wheel carrier assembly according to claim 1 wherein said post section of said mounting portion includes a lateral section between the vertical portion thereof and said bracket section.

3. A spare wheel carrier assembly according to claim 1 wherein said bracket section includes a plate with openings.

4. A spare wheel carrier assembly according to claim 1 wherein said socket member of said mounting portion extends upwardly from a horizontal surface of said vehicle bumper.

5. A spare wheel carrier assembly according to claim 1 wherein said hinge members of said supporting portion are sleeve sections surrounding said post section of said mounting portion.

6. A spare wheel carrier assembly according to claim 1 including a cross member intermediate said hinge members and said connecting section.

7. A spare wheel carrier assembly according to claim 1 wherein at least one of said arm sections of said supporting portion is disposed generally horizontally.

8. A spare wheel carrier assembly according to claim 1 wherein said wheel holding portion is affixed to said cross member.

9. A spare wheel carrier assembly according to claim 1 including latch means disposed on said connecting section joining said arm sections of said supporting portion.

* * * * *